United States Patent
Steinich et al.

(10) Patent No.: US 8,336,218 B2
(45) Date of Patent: Dec. 25, 2012

(54) INCLINATION SENSOR

(75) Inventors: Klaus Manfred Steinich, Zorneding/Pöring (DE); Peter Wirth, Eching (DE)

(73) Assignee: ASM Automation Sensorik Messtechnik GmbH, Moosinning (DE)

(*) Notice: Subject to any disclaimer, the term of this patent is extended or adjusted under 35 U.S.C. 154(b) by 522 days.

(21) Appl. No.: 12/657,662

(22) Filed: Jan. 25, 2010

(65) Prior Publication Data

US 2010/0186246 A1 Jul. 29, 2010

(30) Foreign Application Priority Data

Jan. 28, 2009 (DE) .......... 10 2009 006 368

(51) Int. Cl.
*G01C 9/12* (2006.01)
*G01C 9/02* (2006.01)

(52) U.S. Cl. .......... 33/396; 33/391; 33/366.11

(58) Field of Classification Search .......... 33/396, 33/346, 366.11, 366.14, 366.15, 366.17, 33/366.23, 366.24, 291, 296, 298, 391, 398, 33/402, DIG. 1

See application file for complete search history.

(56) References Cited

U.S. PATENT DOCUMENTS

| | | | | |
|---|---|---|---|---|
| 4,614,041 A * | 9/1986 | Darton et al. | | 33/313 |
| 4,667,414 A * | 5/1987 | Russell | | 33/364 |
| 4,791,730 A * | 12/1988 | Gill | | 33/361 |
| 4,866,379 A * | 9/1989 | Odagawa et al. | | 33/364 |
| 4,885,535 A * | 12/1989 | Odagawa et al. | | 33/364 |
| 4,910,459 A * | 3/1990 | Odagawa et al. | | 33/364 |
| 5,282,318 A * | 2/1994 | Steiner | | 33/355 R |
| 5,365,671 A * | 11/1994 | Yaniger | | 33/366.12 |
| 5,774,996 A * | 7/1998 | Ogawa et al. | | 33/366.12 |
| 5,780,741 A * | 7/1998 | Raj | | 33/366.15 |
| 6,543,147 B2 * | 4/2003 | Akieda | | 33/366.24 |
| 7,555,841 B2 | 7/2009 | Steinich | | |
| 2002/0073564 A1 * | 6/2002 | Akieda | | 33/366.24 |
| 2008/0047154 A1 * | 2/2008 | Steinich | | 33/366.17 |
| 2010/0186246 A1 * | 7/2010 | Steinich et al. | | 33/396 |

FOREIGN PATENT DOCUMENTS

DE 10 2006 061 198 A1 12/2007

* cited by examiner

*Primary Examiner* — Yaritza Guadalupe-McCall (74) *Attorney, Agent, or Firm* — Head, Johnson & Kachigian, P.C.

(57) ABSTRACT

To be able to measure the angular deviation simultaneously in two directions in space a magneto-sensitive sensor unit on the one hand (that can measure the magnetic flux density in at least two directions in space or orthogonal to each other) and a magnet on the other hand are moved relatively to each other, wherein one of both elements are provided in such a way that it aligns itself directly or indirectly according to the gravity. An optimal measuring result is achieved by guiding one of both elements on a defined, reproducible surface so that the center axis of this element is directed always to the center axis of the other element.

22 Claims, 7 Drawing Sheets

INCLINATION SENSOR

I. FIELD OF THE INVENTION

The invention relates to an inclination sensor.

II. BACKGROUND OF THE INVENTION

Inclination sensors are being used for continuously monitoring the angular position of movable machine components, e.g. for safety relevant components, like crane arms, man lifts and similar.

Inclination sensors are provided in various configurations.

Previously, mercury was often used for detecting the changing position of the mercury within an inclination sensor. For reasons of environmental protection, using such mercury sensors is not legal anymore for many applications.

Since then, mostly pendulum sensors are being used, thus a pendulum always lines itself up exactly vertical according to the present gravitational force, possibly dampened in that the pendulum is disposed in a damping cavity filled with damping liquid.

On the support axle of the pendulum, which extends through the pendulum cavity towards the sensor cavity, there is an angle sensitive element in the sensor cavity, whose rotation position is detected, e.g. an incremented rotating disk, which is scanned by a reading head.

The problem of this configuration is the permanently sealed passage of the pendulum shaft through the divider wall and the long-lasting ease of motion of the bearing of the pendulum axle, which facilitates a fast adjustment of the pendulum position to gravity, even for slight angular changes.

Besides that, it is known from DE 203 14 275 not to run the pendulum axle through the divider wall into the sensor cavity anymore, but to dispose a magnet on the pendulum axle within the pendulum cavity, and to detect the rotation position of the magnet contactless through the non-magnetizable divider wall through a magneto sensitive sensor, which is disposed on the opposite side in the sensor cavity.

Also here, the problem still persists that relatively high bearing forces have to be permanently received in a small central bearing axle and with very small static friction, in order to have the pendulum deflect even for the smallest angular deviations.

It is furthermore known to use singular hall elements as magneto sensitive elements, thus hall sensors, as described e.g. in the U.S. Pat. No. 5,365,671.

A single hall sensor, however, can only measure the intensity of the magnetic field, in which it is disposed, and the measurement result is thus highly dependent on the distance of the hall sensor from the encoder magnet.

Therefore, in the present case, the moving body, which aligns itself according to gravity and at which the magnet is disposed, is received in a very tightly enveloping support housing. Thus, in order to reduce the friction in the adjacent support surfaces, the cavity in which the moving body is disposed, is completely filled with a liquid, whose specific weight corresponds to the specific weight of the pivot body, so that it floats in the liquid quasi weightless (column 2, line 45 of U.S. Pat. No. 5,365,671). Thus, it is a pendulum with a center of gravity outside of the center of rotation of the pivot body, whose bearing is formed by the outer surrounding support surfaces.

Furthermore, it is known differently from that, to dispose the encoder magnet in a float. However, all these sensors only measure an angular deviation in one measurement direction.

III. DETAILED DESCRIPTION OF THE INVENTION a) Technical Object

Thus, it is the object of the invention to provide an inclination sensor, which measures the angular deviation simultaneously in two directions in space, and which can be produced in a simple and cost effective manner.

b) Solution

The object is accomplished through the features of patent claim 1. Advantageous embodiments can be derived from the dependent claims. For purposes of the present invention, the subsequent terms are being defined.

Center Axis of the Operative Element:
for the sensor unit, or the sensor element operative therein, this is the orthogonal of the two orthogonal measurable spatial directions, in which the sensor element is capable of measuring the magnetic flux, thus establishing the measurement plane, thus the orthogonal to the measurement plane;

for an embodiment of the sensor element as a sensor chip, it is the orthogonal, which extends through the center of the sensor element in top view;

for a magnet, the center axis is the axis of the pole direction, thus the connection line between the center of the north pole and the center of the south pole.

Center Point of the Operative Element:
for the sensor element, it is the geometric center of the sensor element in top view;

for the magnet, it is the point in the disposed in the geometric center between the north pole and the south pole.

Pivot Point of the Operative Element:
For two elements pivotable relative to one another, herein the operative elements, it is only an issue of definition, which of the two elements is considered fixated and which element is considered pivotable relative thereto. Typically, pivoting the pivotable element is performed about an always constant center of gravity, and thus the pivotable element moves on a spherical surface, as long as the distance from this center of gravity always stays the same, which is typically the case.

The center of gravity is thus the point to which the center axis of the operative element points in any movement state.

Pivot Axis of the Operative Element:
The pivotability about a center of gravity can be implemented in practical applications by supporting the operative element pivotable about two separate pivot axes, which intersect in its center of gravity, like through a universal joint, so that the operative element can assume any position on the spherical surface about the center of gravity, on which spherical surface it is positioned.

By omitting the mechanical support, like for a pendulum with an enclosing bearing mostly disposed on a small diameter, the support forces for a float or floating body can be kept much lower, as a function of the shape of the float relative to the float body, but also as a function of the liquid employed and of auxiliary devices.

The contact between float and float cavity occurs, if it occurs at all, only at the outer circumference of the float, and thus on an effective diameter, which is already much larger than for the rather punctiform central support of a pendulum, and additionally the size of the contact surface can be kept smaller. The mechanically much simpler configuration of a float disposed in a liquid providing an exact mechanical support comes with the downside that the pivot axis of the float can be fixated less exact than with a mechanical support. On the other side, however, this is negligible in view of the detection precision with which the magnetostrictive sensor detects the rotating position of the encoder magnet through the divider wall.

Furthermore, the disadvantage of a pendulum, where the size of the reversal moment is a function of the pendulum mass and its distance from the pivot axis in downward direction, is being avoided. Thus, a pendulum always has to have a minimum extension in vertical, thus radial, direction.

For a pendulum, the float can be configured relative to the liquid, so that the center of gravity of the float is disposed below the liquid level. Thus, the float aligns itself analogously to the liquid level; the liquid level, however, aligns itself as a function of gravity.

The other option is that the center of gravity of the float is exactly at the level of the liquid level, accordingly the float cannot only assume one rotation position within the liquid but several different rotation positions within the liquid, wherein it is rotatable about its longitudinal axis, which is at the level of the liquid level. In particular, it can be rotation symmetrical, and thus in stable, which, however, is not negative for the function of the sensor.

By using a multi-hall sensor, in particular a multi-hall IC, either configured as a vertical or horizontal multi-IC, a static gradient can be measured, thus how much the intensity of the present magnetic field increases or decreases over the extension of the sensor, in particular of an IC, which facilitates calculating the inclination of the generating magnetic field axis relative to the orientation of the sensor.

This has the advantage that only the angular position of the magnetic field is detected relative to the orthogonal of the sensor axis, thus relative to the pivot axis, however, all other angle deviations of the magnetic field axis hardly degrade the measurement result.

Accordingly, in the inclination sensor, preferably the magnet is positioned at the float, so that furthermore the height of the liquid level with reference to the submersion depth of the float is adjusted so that the magnet is disposed at the level of the sensor.

Additionally, the magnet is disposed at the float so that the magnet axis is orthogonal to the fluid level.

In order to assure that the center of the magnet is always precisely at the level of the sensor, generally the contour of the float is adapted as precisely as possible to the contour of the float cavity, in order to prevent the float from drifting.

Accordingly, the float is supported in the float cavity also in transversal direction, e.g. so in that in top view, the width of the float is only slightly smaller than the inner width of the float cavity.

Thus, also the remaining clearance and the amount of liquid required are reduced, which in turn reduces the propensity of the liquid to slosh uncontrollably when there are strong inclination changes.

In order to reduce the friction between the floats and the wall, the contact between them can be performed by protrusions which only have a small surface, like e.g. punctiform knobs, which are either disposed at the inner surfaces of the float cavity or at the outer surfaces of the float. A well lubricating liquid, like e.g. thin oil, additionally reduces the friction there between.

Still different geometric configurations of the float itself are conceivable.

According to theses basic principles, it is possible in a simper manner to provide a two-axes inclination sensor by disposing a flat sensor element pivotable relative to a magnet, which sensor element is capable to measure the magnetic flux in at least two orthogonal spatial directions, the so-called measurement directions, thus establishing a measurement plane, and to support the operative elements relative to one another, so that the center axis of the one operating element always points to the center axis, preferably directly to the center of the other operative element.

Thus in practical application the one operative element mostly the sensor element is fixated to the component whose inclination shall be detected, whereas the magnet which does not require any electrical feed lines is disposed pivotable relative to the sensor element and preferably provided as a float in a liquid.

In the starting position of the two operative elements relative to one another the center of gravity of the one operative element is disposed on the center axis of the other operative element. As already recited supra the center axis of the magnet is its pole axis, while the center axis of the sensor elements forms the orthogonal relative to the measurement plane of the sensor element.

The movability of the one operative element relative to the other operative element thus has to be provided on a defined and thus reproducible surface which does not necessarily have to be a curved surface.

However, a spherical ball shaped surface is preferred which has the same distance to the center of gravity thus the center of the spherical surface at each point, since this significantly simplifies processing the signal relative to surfaces shaped differently e.g. irregular surfaces.

The pivotability of one of the operative elements along a spherical surface about a center of gravity can be achieved in a practical mechanical support in that the support element is pivot ability supported about 2 pivot axes intersecting in the center of gravity, in particular placed orthogonal to one another however instead of a support about separate pivot axis the gravity alignment of the one operative element is achieved in that this operative element floats on a liquid as a float.

Particularly good results can be achieved when the sensor unit is keep able to measure the magnetic flux not only in 2 but in all 3 directions in space and is keep able to compute the changes of the magnetic field in both measurement directions X and Y there from. In practical applications the sensor elements is an integrated circuit thus a chip which is configured flat and thus has a main plane parallel to its greatest surface extension which is typically also the measurement plane.

Preferably, the processing electronics of the sensor unit should be capable for a spherical movement of the one operative element about the other operative element in particular of the magnet about the sensor element to consider the influence of this movement along the spherical surface for processing.

The radius of the spherical surface on which the pivotable operative element moves is preferably entered as an input value by the processing electronics of the sensor unit.

Typically the measurement result is the better the smaller the radius of the spherical surface, so that the optimum case is comprises in that to approximate the radius of the spherical surface of 0. Thus to move the center of gravity of the pivotable operative element as close as possible to the center of the other operative element, in particular make the centers coincide.

Thus, rotations of the magnet about an axis perpendicular to the measurement place, in particular about its pole axis are irrelevant and do not have to be considered for processing.

The subsequent description is based on the premise that the magnet is the moveable pivotable operative element and the sensor element is the fixed operative element without the invention being limited thereto.

In order to implement the desired pivot ability of the one operative element, in particular of the magnet also a pendulum suspension, in particular as a cardan pendulum thus pivotable about 2 pivot axis perpendicular to one another is possible. Still the preferred is the disposition of the magnet at a float or in a float which aligns with gravity in a float cavity or floating on a liquid.

The sensor element is thus disposed preferably outside of the float cavity separated by a divider wall, for which purpose the divider wall only must not be magnetiziable in order to let the magnetic field of the magnet pass through.

In order to support the float and thus the magnet the best way possible the outer contour of the float is adapted to the inner contour of the float cavity.

Viewed perpendicular to the fluid level the float preferably substantially fills the float cavity wherein small surface protrusions can be provided on the outside of the float towards the outside wall of the float cavity for contacting the wall of the float cavity with the lowest friction possible.

The float cavity itself viewed in the direction of the fluid level is configured circular or at least circle segment shaped depending on the permissible pivot angle of the float and thus views 3 dimensionally it is a ball or a sphere or it is a sphere flattened at 3 points disposed opposite from one another.

In order to prevent a full rotation of the float in the float cavity a slosh baffle can be disposed in the float cavity which is positioned vertical to the fluid level in normal condition in which slosh baffle also pass through openings can be provided as choke points.

It is another possibility to fill the float cavity with 2 fluids which are difficult to mix and which have different specific weight and to size the specific weight of the float so that it floats on the heavy fluid, thus so that it is in the contact portion of the 2 fluids. A particularly preferred is comprised in that the float is a disc shaped, in particular circular disc shaped float and the magnet in the center of the float is disposed with a pole axis perpendicular to the disc plane and thus the liquid level. The float is then disposed in the spherical or flattened spherical float cavity described supra, while the sensor element is disposed outside of the float cavity with the measurement plane tangential to the spherical float cavity or parallel to one of the flattened sides of the flattened spherical float cavity.

In another preferred embodiment the float cavity has a spherical shape with a spherical outer or reference with a spherical outer reference surface and a spherical inner reference surface disposed concentric there to so that the spherical float cavity encloses a free space in its center in which the sensor element is disposed.

For the accessibility of the sensor element in the center cavity, the spherical float cavity is open on one side, thus configured U-shaped in cross section.

The float is thus configured flat and sized so that it contacts the spherical inner divider wall of the float cavity with the center of one of its main outer surfaces and contacts the inside of the outer spherical divider wall of the float cavity with the outside edges of the other main outer surface.

Since the magnet in this float is disposed with a pole axis perpendicular to the main plane of the flat float in its center the float moveable along the spherical float cavity always points with its pole axis to the center of the spherical float cavity in which the sensor element is disposed.

The third preferred embodiment differs from the second preferred embodiment in that no disc shaped float is disposed in the described spherical float cavity, but an annular float, which is sized so that the center of the ring coincides with the center of the spherical float cavity. The center of gravity of the annular float is thus disposed in the center of the spherical float cavity in which typically in turn the sensor element is disposed. In this case an annular magnet is used as a magnet which is fabricated into the annular float and whose pull direction extends perpendicular to the main plane of the annular float and thus always extends through the center of the spherical float cavity and thus through the sensor element.

Thus it is a magnet which is pivotable on a spherical surface with radius zero about the sensor element.

c) Embodiments

An embodiment according to the invention is subsequently described in an exemplary manner with reference to the drawing Figure, wherein.

FIGS. 1a-d show the possible movements of the operative elements 8, 9 relative to one another.

Figure 1A:
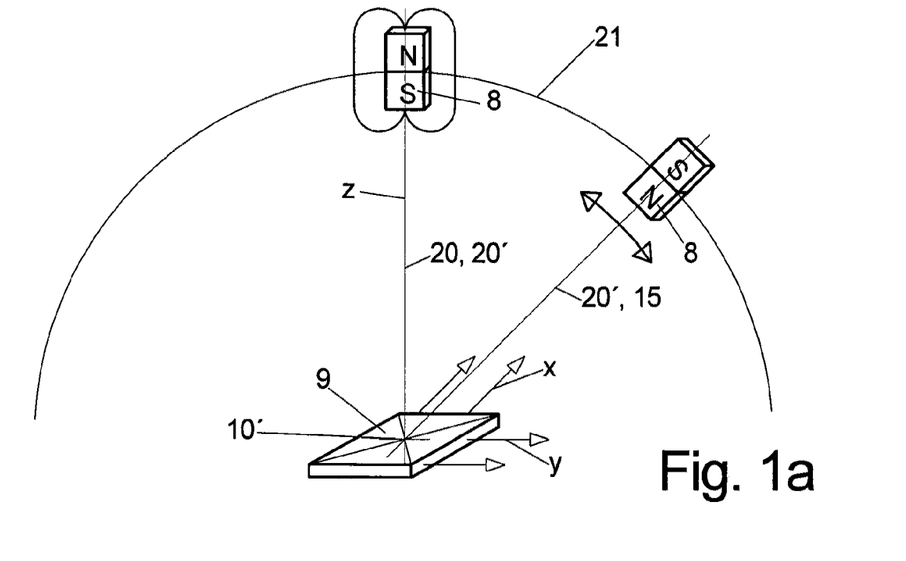
FIG. 1 illustrates the geometric movement possibilities of the two operative elements relative to one another.

In FIG. 1a the sensor element 9 is assumed to the standing still. The flat sensor element 8 is keep able to measure changes in the magnetic flux in both directions of the main plane of its surface extension, the measurement direction X and Y and possibly also in the Z direction perpendicular to the X, Y measurement plane.

If the sensor element 9 is mounted to a component whose rotating position shall be detected in space the magnet 8 adjusts according to gravity which magnet is moveably supported thus pivotably supported relative to the sensor element 9 so that it is disposed in the starting position illustrated in FIG. 1a in the middle exactly on the orthogonal center axis 20 extending through the center of the sensor element 9, when the sensor element 9 is aligned horizontally. The center axis 20' of the magnet 8 then coincides with the center axis 20 of the sensor element 9.

However, when the magnet 8 pivots about the center of the sensor element 9, which is a spherical surface 21 with the radius remaining constant this yields the situation illustrated in the right portion of FIG. 1a, however the pole axis 15 of the magnet 8 always points to the center of the sensor element 9.

Only when the center of gravity 10' of the magnet 8 would not disposed in the center of the sensor element 9 but e.g. offset there to on another point of the center axis 20 of the sensor element 9. This would not be the case anymore whereby the measurement result would be degraded.

Figure 1B:
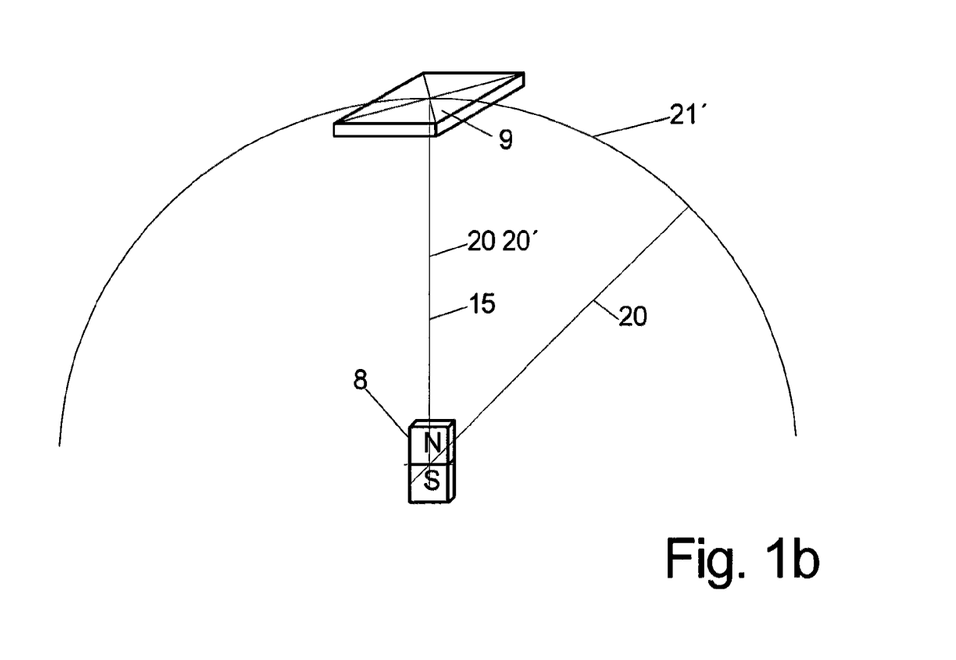
Figure 1C:
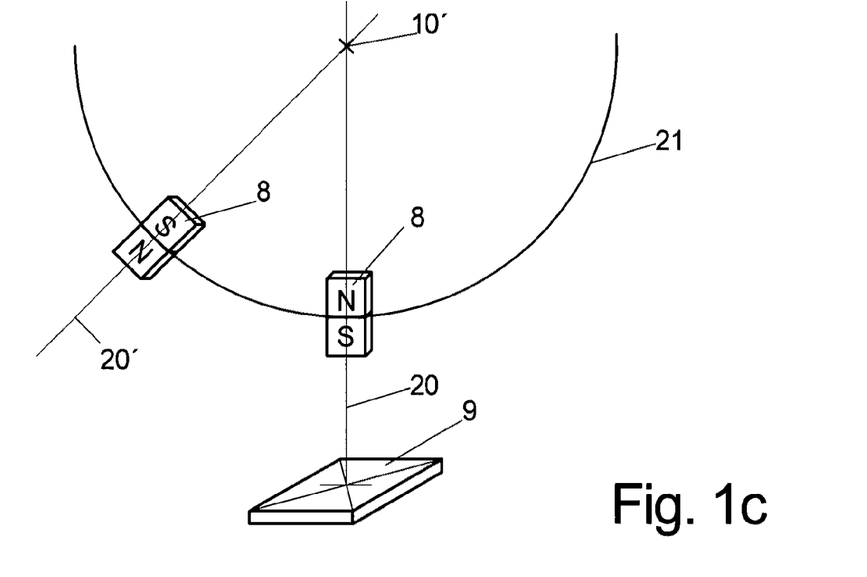

This variant is illustrated in FIG. 1c in which the pivot point 10' about which the magnet 8 pivots is disposed on the center axis 20 of the sensor element 9, but not in the sensor element 9 but offset there from.

When the fixed sensor element 9 is disposed on the outside of the center surface 21 facing away from the center of gravity 10', along which the magnet 8 can move thus already small deflections of the magnet 8 cause a strong change of the flux in the portion of the sensor element 9 there for this constellation is primarily suitable for detecting small deflections from the normal position.

This holds even more when the pivot point 10' of the magnet 8 is not disposed on the center axis 20 of the sensor element.

Contrary thereto, the solution according to FIG. 1a can also cover large deflection of the normal position.

The illustration of FIG. 1a is rotation symmetrical to the Z-axis thus to the center axis 20 of the sensor element 9.

The statements made supra are applicable analogously to the configurations of FIGS. 1b-1d described subsequently.

In FIG. 1b the two operative elements 8, 9 are exchanged in their position relative to FIG. 1a so that the magnet 8 is assumed to be the fixed component which points to the sensor element 9 with its pole axis 15 which sensor element is in its initial position. The center axis 20 of the sensor element 9 however points to the center of the magnet regardless of the position which the sensor element assumes at the moment on the spherical 21' about the magnet 8.

Figure 1D:
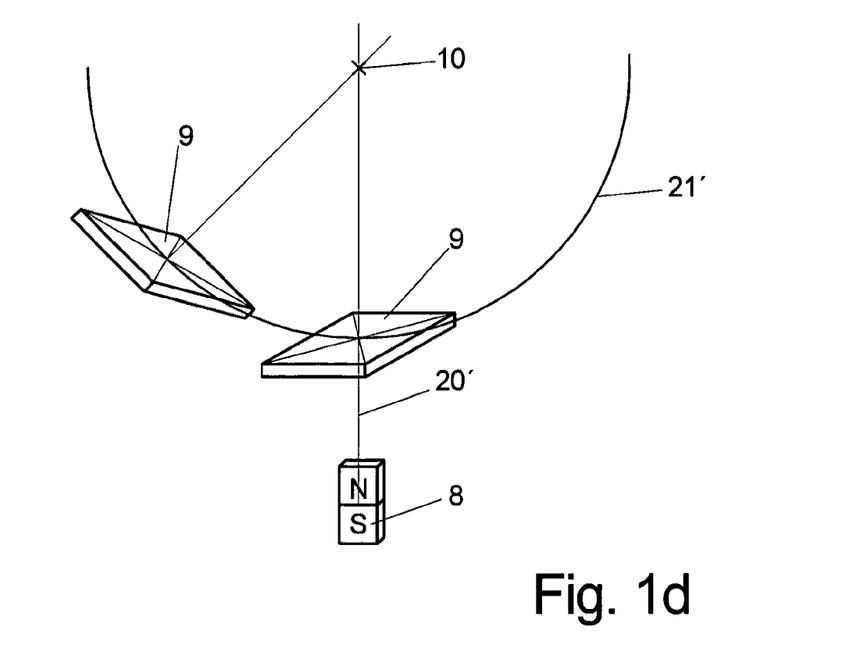

Analogously thereto, FIG. 1d shows a variation of the situation according to FIG. 1b according to which the magnet 8 which in turn is presumed to be standing still is disposed on the outside of the spherical surface 21' along which the sensor element 9 is moveable. The center of gravity 10 of the sensor element in turn is disposed on the center axis 20' of the magnet 8.

For all of the subsequently illustrated real life embodiments holds that longitudinal cut views thus solutions illustrated in FIGS. 2a, b, 3, 4a, b, 5a, b are rotation symmetrical about the center vertical axis of the figures, thus the center axis 20 of the sensor element 9, or in FIG. 3 the center axis between the two sensor elements.

In FIGS. 2 and 4 the moveable operative elements 8, 9 are shown in the normal position respectively, in FIG. 5 they are shown through circumferential lines additionally in a deflected position.

The solution according to FIG. 2 corresponds to the geometric situation of FIG. 1b.

Though typically here also the sensor element 9 is mounted with its surrounding housing component 2' at the component whose inclination shall be detected, still the magnet 8 is held in position through the surrounding float cavity 4 and when the magnet 8 is deflected relative to the sensor element 9 the sensor element 9 performs a pivoting movement about the center of the magnet 8 which remains in position.

Figure 2A:
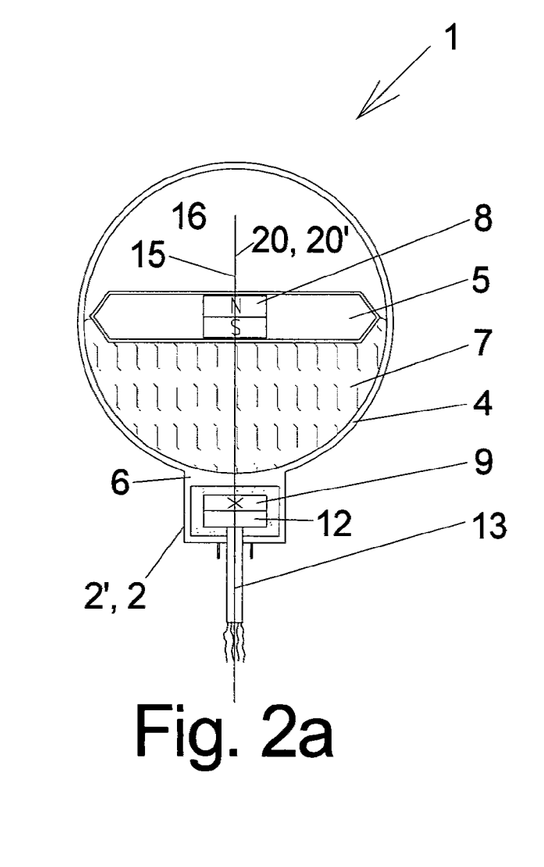
FIG. 2 shows a first embodiment of the inclination sensor.
Figure 2B:
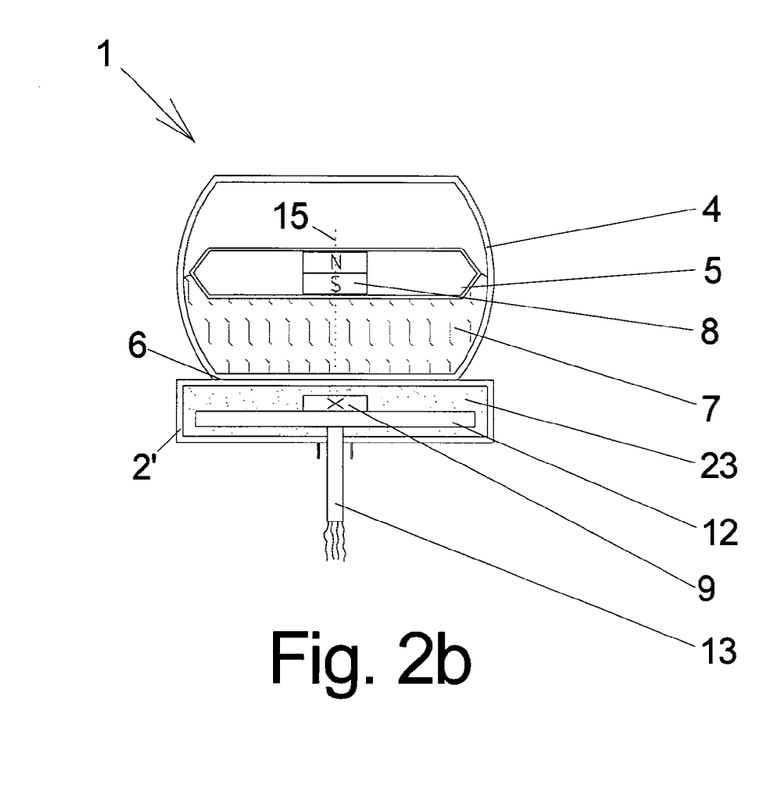
Figure 2C:
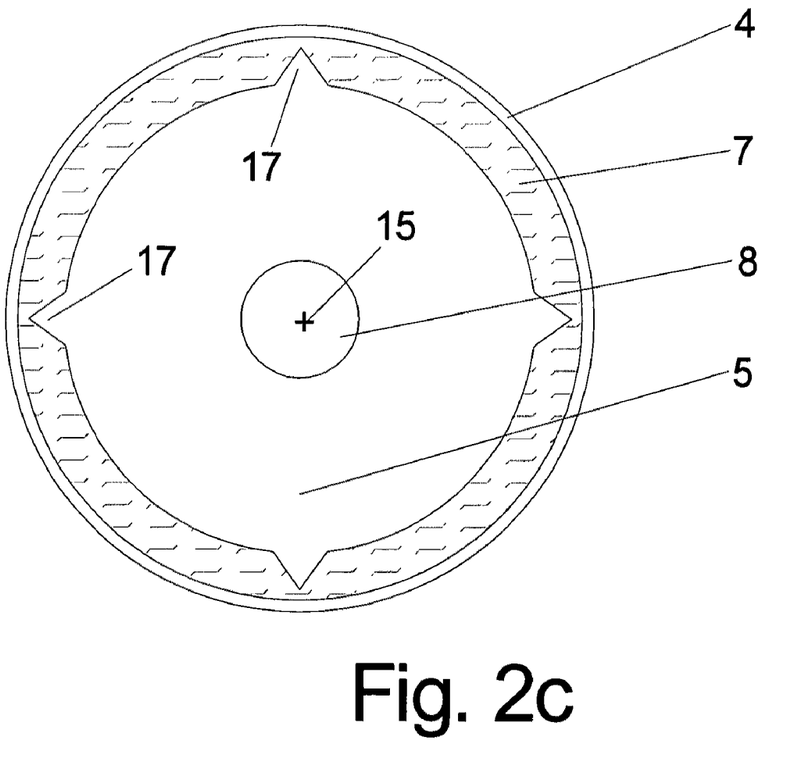

In the embodiment according to FIG. 2a and FIG. 2b in top view according to FIG. 2c thus viewed in the direction of the center vertical axis of the FIGS. 2a, b the float 5 in which the magnet 8 is received covers almost the complete diameter of the interior of the float cavity 4.

Thus the actual float 5 is also circular like in this view the interior of the float cavity 4 but with significantly smaller diameter. It could however also have any other circumferential shape.

However tips 17 reach further to the outside from the actual float 5 and the diameter of the float measured at the tips corresponds to the inner diameter of the float cavity 4 at the location of the largest diameter however the friction is limited to a minimum through the small contact surface between the tips 17 and the float cavity 4.

As shown in the FIGS. 2a-2c the pole axis 15 of the magnet 8 centrally disposed in the float 5 extends vertically to the main plane of the flat float 5 and thus the liquid level.

The float cavity 4 is filled with a fluid 7 up to this point with the largest diameter and the weight of the float 5 is sized so that the float approximately half submerged in the fluid forms the diameter through the float cavity 4 with is outward protruding tips 17 in the initial position in the side view of FIG. 2a.

The rest of the interior of the float cavity 4 is either filled by a gas volume 16 or by a liquid that is lighter than the lower liquid 7.

In the solution according to FIG. 2a the float cavity 4 is circular in side view, thus spherical in a 3 dimensional view and the housing 2 at its lowest point is expanded outward by a housing component 2' in which the sensor element 9 is disposed, mostly disposed on a circuit board 12 which can include the processing electronics for the signal of the sensor element 9 when sufficiently sized.

From there a cable 13 leads out of the housing component 2' which is a portion of the entire housing 2 of the inclination sensor mostly radially leading away from the spherical float cavity 4.

The configuration of FIG. 2b differs from the configuration in FIG. 2a in that the spherical float cavity 4 in FIG. 2a is flattened at the top and at the bottom so that the float 5 which is disposed precisely fitting in the center largest diameter cannot be pivoted at will but can only the pivoted about a limited pivot angle.

At one of the flattened sides here the bottom side in this case a separate housing component 2' is disposed in which the sensor element 9 is disposed contrary to the integral configuration of the housing 2, which also includes the housing component 2' for the sensor element 9 according to FIG. 2a.

However in the solution according to FIG. 2b the printed circuit board on which the sensor element 9 is mostly provided in the form of a chip is selected significantly larger, since for this purpose at least the extension of the flattened side of the float cavity 4 is available.

Thus on the much larger printed circuit board 12 from which in turn a cable 13 leads outward from the housing component 2' typically the entire processing electronics for the signals of the sensor element 9 can be disposed without problems.

Figure 3:
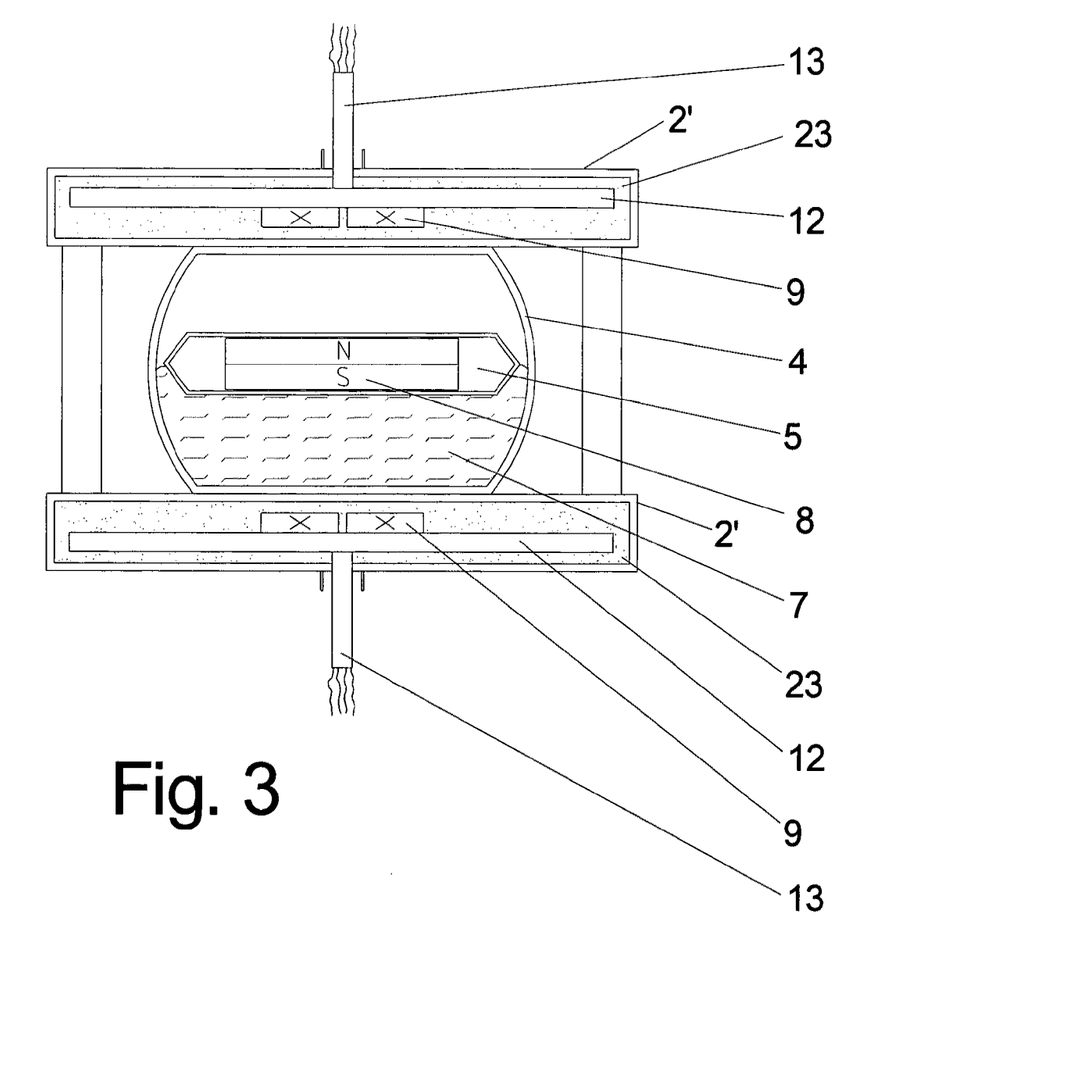
FIG. 3 shows a redundant version over FIG. 2.

The embodiment of FIG. 3 is a redundant embodiment and differs from the embodiment in FIG. 2 in that at the two flat spots of the float cavity 4 housing components 2' with sensor elements 9 received therein are disposed.

Additionally at this location not only a sensor element 9 can be disposed here on a circuit board 12 and in a housing component 2' but also two sensor elements next to one another which are thus disposed symmetrical on both sides of the center axis of the magnet 8 in a starting position, so that in the starting position also the center axis of the sensor element 9 are disposed in parallel but slightly laterally offset relative to the center axis of the magnet 8.

The FIGS. 4 and 5 however show solutions with a spherical float cavity 4.

This corresponds to the geometric configuration according the FIG. 1a. Thus analogously to the solution according to the FIG. 2a the float cavity 4 has an outer wall 4a which is entirely or at least partially spherical and on one side, the top side flattened so that approximately one quarter to one third of the ball is missing.

Additionally the float cavity 4 has an inner wall 4b which also is at least partially spherical, here half spherical at which a cylindrical section with the same diameter is connected.

The spherical, herein semi spherical portion of the inner wall for b thus extends concentric to the outer wall 4a which forms a float cavity 4 which has a circular camber in portions, which float cavity is thus spherical, in which a circular disc shaped float 5 is disposed, which is sized with respect to diameter and thickness so that it barely touches with the circumferential edges of its outer surface at the interior of the outer wall 4a and touches with the center of its inward oriented main surface at the outside of the inner wall 4b.

Through these very much reduced contact surfaces additional protrusions like the tips 17 can mostly be omitted for the solutions according to FIG. 2.

In the inner cavity which is enclosed by the inner wall 4b, preferably in the center of the curvature of the inner wall 4b and the outer wall 4a the sensor element 9 is disposed, which in turn is disposed on a circuit board 12 from which a cable 13 is run through the flattened portion of the spherical shape of the outer wall 4a and the opening in the inner wall 4b to the outside thus run in upward direction.

The friction of the edges of the outer surface of the float 5 at the outer wall 4a can be further minimized by using a Ferro as a fluid which adheres to the magnetic float 5, when preferably the entire float 5 is comprised of the magnet 8.

The friction relative to the outer wall 4a is further reduced through the Ferro fluid accumulated at the outer edges.

Figure 4A:
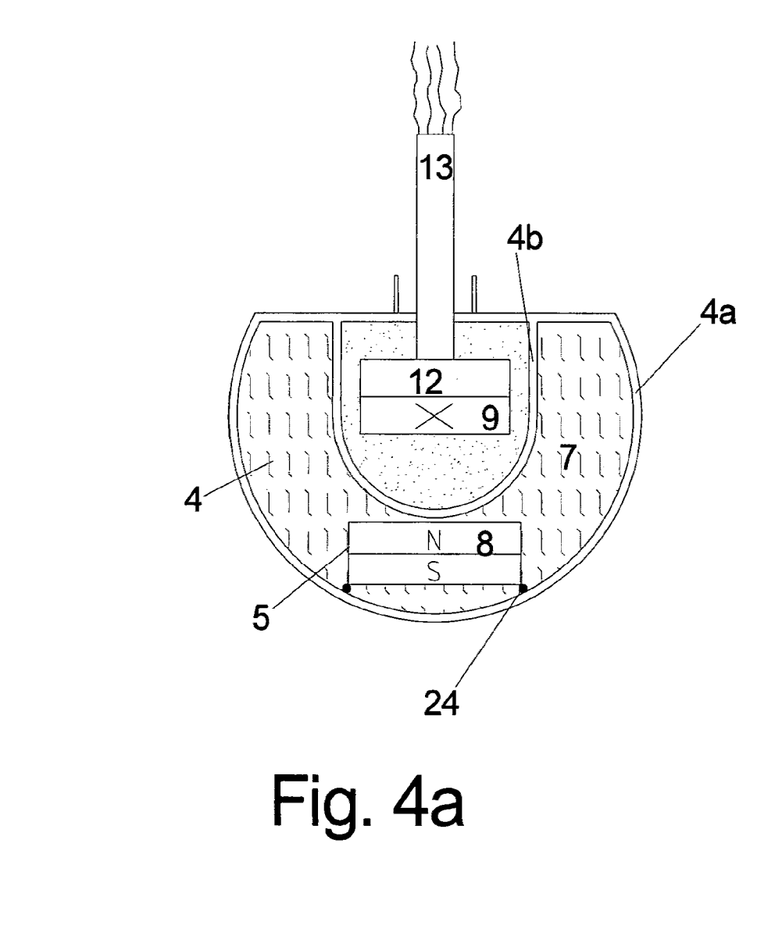
FIG. 4 shows second embodiment of the inclination sensor.
Figure 4B:
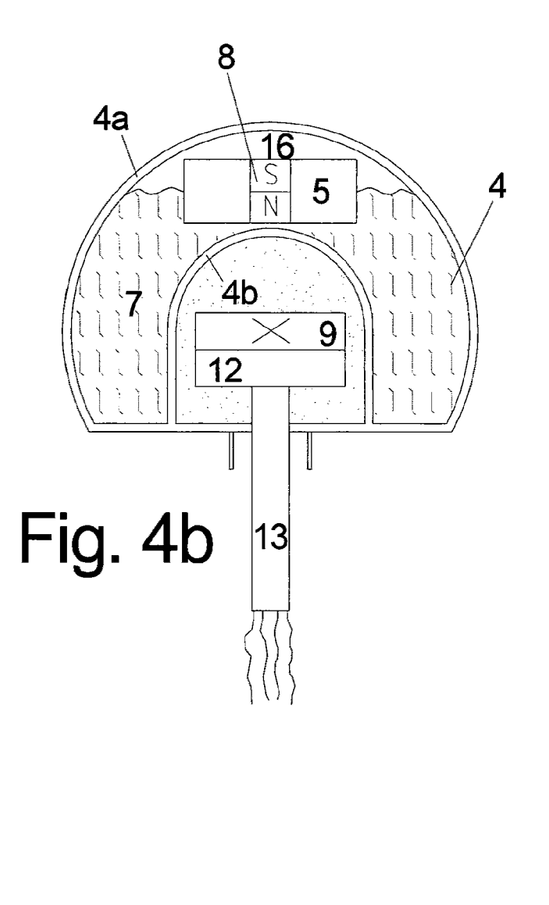

For this solution in which the spherical float cavity 4 is disposed with the opening in upward direction, the float cavity 4 is completely filled with a liquid and the magnet 8 does not have to be a float thus its specific weight does not have to be lower than the specific weight of the surrounding fluid 7 contrary to the solution according to FIG. 4b, in which the opening of the spherical float cavity 4 is oriented downward.

Therein the float cavity 4 is not completely filled with a fluid but mostly filled with a fluid 7 and the float is disposed therein.

As described for FIG. 4a the float 5 is circular disc shaped and sized so that the filling level of the fluid 7 is sized so that the float that also here the float 5 contacts or almost contacts the inner wall 4b with its outer edges at the outer wall 4a and with the center of its inward oriented primary surface.

The fact that the spherical float cavity 4 is entirely or only partially filled with a fluid 7 and accordingly the magnet 8 is configured as a float or not configured as a float, a variant which is applicable for all figures however does not depend on the fact if the opening of the spherical float cavity 4 is oriented upward or downward.

Thus while in each pivot position of the magnet 8 in the FIG. 4 and also for the solutions in FIGS. 2 and 3 the magnet 8 and the sensor element 9 were remote form on another along the center axis 20 or 20' of one of these 2 operative element, FIG. 5 shows a solution in which the center of the magnet coincides with the center of the sensor element 9 for a spherical float cavity.

For this purpose the spherical float cavity for which in the case only the outer wall 4a is spherical or has to have a spherical portion is only filled with a fluid 7 up to half its height and the magnet 8 is disposed in a float 5 which floats on the fluid 7 and is only partially submerged into the fluid 7.

However, the float 5 is configured annular and also the magnet 8 received therein is an annular magnet and both together extend about the inner cavity 25 which is formed by the inner wall 4b.

In the inner cavity 25 the sensor element 9 is disposed in the center of the spherical outer wall 4a, in turn on a circuit board 12.

Figure 5A:
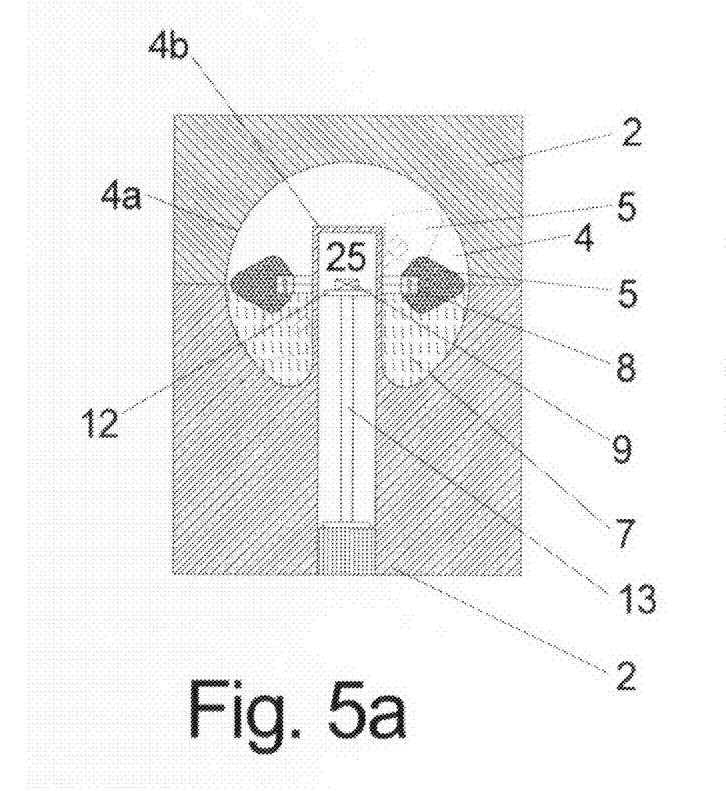
FIG. 5 shows a third embodiment of the inclination sensor.
Figure 5B:
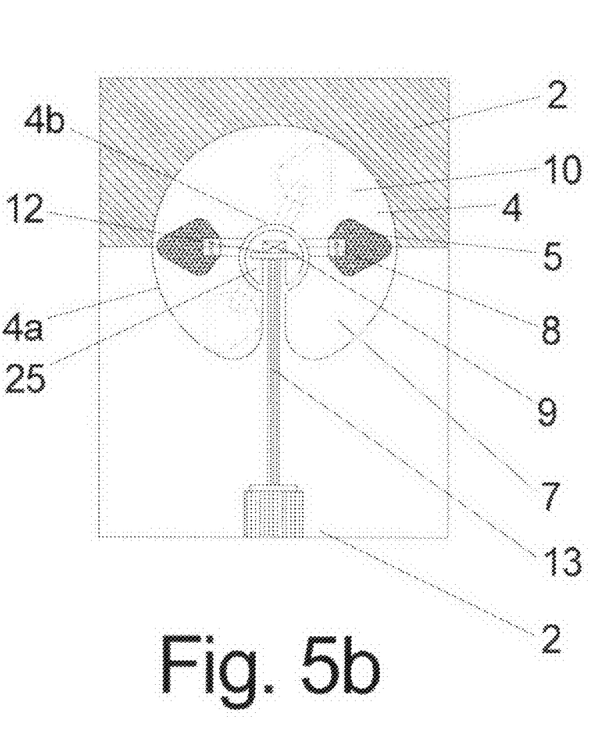

While the inner cavity 25 is cylindrical for the configuration according to FIG. 5a, it has a semi spherical end portion according to FIG. 5b in the center of the spherical outer wall 4a, from which only a narrow connection channel leads radially out of the housing 2 of the float cavity 4.

In FIGS. 5a and 5b besides the normal position of the annular float 5 also a deflective position with circumference line is shown.

REFERENCE NUMERALS AND DESIGNATIONS 1 inclination sensor
2, 2' housing
3 sensor cavity
4 float cavity
4a outer wall
4b inner wall
5 float
6 divider wall
7 fluid
7a fluid level
8 magnet, operative element
9 sensor element, operative element
10, 10' pivot point
11 measurement plane
12 circuit board
13 cable
15 pole axis
16 gas volume
17 tip
18 slosh baffle
19 multi-hall-IC
20, 20' center axis
21, 20' spherical surface
22a, b pivot axis
23 encasement
24 Ferro fluid
25 inner cavity
x, y measurement direction
z third spatial direction

What is claimed is:

1. A two-axis inclination sensor (1) with two operative elements, which comprises:
    a) a magneto-sensitive sensor unit with a flat sensor element (9) capable of measuring the magnetic flux in at least two orthogonal directions in space, the measurement directions,
    b) a magnet (8),
    c) wherein two operative elements (8, 9) are pivotable relative to one another and one of the two operative elements (8, 9) directly or indirectly aligns itself with gravity,
    d) the pivot point (10, 10') of one of the operative elements (8 or 9) is disposed on the center axis (20, 20') of the respective other operative element (9 or 8),
        wherein for the sensor element (9) the center axis (20) is the orthogonal for the measurement plane, and
        the center axis (20') is the pole axis for the magnet (8),
        wherein the one operative element (8 or 9) is moveably guided on a defined, thus reproducible surface (21, 21'), so that the center axis (20, 20') of this operative element (8 or 9) always points to the center axis (20, 20') of the other operative element (9 or 8).

2. An inclination sensor (1) according to claim 1, wherein the surface (21, 21') on which the operative element (8) or (9) is moveably guided is a spherical surface.

3. An inclination sensor (1) according to claim 2, wherein the radius of the spherical surface (21) on which the operative element moves, is an input value of the processing electronics of the sensor unit.

4. An inclination sensor (1) according to claim 1, wherein the one operative element (8 or 9) is moveably supported on a spherical surface (21, 21'), so that the center axis (20, 20') of this operative element (8 or 9) always points to the center of the other operative element (9 or 8).

5. An inclination sensor (1) according to claim 1, wherein an operative element (8, 9) is pivotably supported about two pivot axes (22a, b) which are respectively disposed parallel to the measurement plane.

6. An inclination sensor (1) according to claim 1, wherein the sensor unit is capable to measure the magnetic flux and to calculate the change of the magnetic field from a deflection about the tow measurement directions (x, y).

7. An inclination sensor (1) according to claim 1, wherein the sensor unit measures the gradient of the magnetic flux in the at least two measurement directions (x, y . . . ).

8. An inclination sensor (1) according to claim 1, wherein the sensor element (9) is a multi-hall sensor in the form of an IC (19).

9. An inclination sensor (1) according to claim 1, wherein the sensor element (9) is only a single chip.

10. An inclination sensor (1) according to claim 1, wherein the processing electronics of the sensor unit are capable of spherical movement, in particular of the magnet (8) about the sensor element (9) to consider the influence of the movement along the spherical surface (21) for processing.

11. An inclination sensor (1) according to claim 1, wherein a rotation of the magnet (8) about an axis (z) perpendicular to the measurement plane is not considered during processing.

12. An inclination sensor (1) according to claim 1, wherein the magnet (8) at or in a float (5) or float body is disposed on a fluid (7) in a float cavity (4) pivotable about the two measurement directions of the measurement plane (11), and the sensor element (9) is disposed outside of the float cavity (4) and separated by a divider wall.

13. An inclination sensor (1) according to claim 12, wherein the outer contour of the float (5) is adapted to the inner contour of the float cavity (4) and in particular the float cavity (4) viewed in the direction of the measurement plane (6) comprises at least a circular segment shape, in particular a circular contour.

14. An inclination sensor (1) according to claim 12, wherein viewed orthogonal to the plane of the divider wall (6), the width of the float (5) substantially fills the inner clear width of the float cavity (4) and thus the orthogonal of the divider wall (6) extending through the center of the width of the float cavity (4) forms the pivot axis (10) of the float (5).

15. An inclination sensor (1) according to claim 12, wherein protrusions with small surfaces are disposed on the outside of the float (5) or on the inside of the float cavity (4) for contacting the respective other element.

16. An inclination sensor (1) according to claim 12, wherein a slosh baffle (18) is disposed in the float cavity (4), so that a full rotation of the float (5) is prevented.

17. An inclination sensor (1) according to claim 16, wherein pass through openings are configured as choke points in the slosh baffle (18).

18. An inclination sensor (1) according to claim 12, wherein the float cavity (4) is filled with two fluids (7) with different specific weights which can be mixed only with difficulty and the float (5) floats on the heavy fluid (7).

19. An inclination sensor (1) according to claim 12, wherein the float (5) is disposed annular and in the center of the float (5) there is the sensor and the magnet configured as an annular magnet (8) disposed in the float with a pole axis (15) parallel to the axis of the ring.

20. An inclination sensor (1) according to claim 12, wherein the float is a disc shaped in particular circular disc shaped float and the magnet in the center of the float is disposed with a pole axis perpendicular to the plane of the disc.

21. An inclination sensor (1) according to claim 12, wherein
the float is disposed in a float cavity which comprises a spherical outer and a spherical inner defining surface concentric thereto, and the float is sized, so that it can only move in this spherical float cavity in a locked manner, so that its center axis is always oriented towards the center of the spherical outer or inner surfaces; and
the magnet in the float is disposed with a pole direction on its center axis; and
is disposed in the center of the spherical surfaces of the inclination sensor.

22. An inclination sensor (1) according to claim 1, wherein the magnet (8) is disposed on a pendulum which is moveable about both measurement directions (x, y), in particular a pendulum suspended on an universal joint.

* * * * *